(12) United States Patent
Yegani et al.

(10) Patent No.: US 7,962,123 B1
(45) Date of Patent: *Jun. 14, 2011

(54) AUTHENTICATION OF ACCESS TERMINALS IN A CELLULAR COMMUNICATION NETWORK

(75) Inventors: Parviz Yegani, Danville, CA (US); Jayaraman Iyer, Sunnyvale, CA (US); Timothy P. Stammers, Raleigh, CA (US); Anand K. Oswal, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 200 days.

This patent is subject to a terminal disclaimer.

(21) Appl. No.: 11/682,857

(22) Filed: Mar. 6, 2007

Related U.S. Application Data

(60) Provisional application No. 60/780,176, filed on Mar. 6, 2006.

(51) Int. Cl.
*H04W 4/00* (2009.01)

(52) U.S. Cl. ........ 455/411; 455/423; 370/328; 370/338; 380/270

(58) Field of Classification Search .................. 370/328, 370/341, 338; 455/411, 423; 380/270
See application file for complete search history.

(56) References Cited

U.S. PATENT DOCUMENTS

| | | | |
|---|---|---|---|
| 5,602,907 A | 2/1997 | Hata et al. | 379/114 |
| 5,822,411 A | 10/1998 | Swale et al. | 379/111 |
| 5,828,737 A | 10/1998 | Sawyer | 379/114 |
| 5,905,736 A | 5/1999 | Ronen et al. | 370/546 |
| 5,909,238 A | 6/1999 | Nagashima et al. | 348/3 |
| 5,946,670 A | 8/1999 | Motohashi et al. | 705/400 |
| 5,956,391 A | 9/1999 | Melen et al. | 379/114 |
| 5,970,477 A | 10/1999 | Roden | 705/32 |
| 5,987,498 A | 11/1999 | Athing et al. | 709/203 |
| 6,016,509 A | 1/2000 | Dedrick | 709/224 |
| 6,035,281 A | 3/2000 | Crosskey et al. | 705/14 |
| 6,047,051 A | 4/2000 | Ginzboorg et al. | 379/130 |
| 6,070,192 A | 5/2000 | Holt et al. | 709/227 |
| 6,075,854 A | 6/2000 | Copley et al. | 379/211 |
| 6,131,024 A | 10/2000 | Boltz | 455/405 |
| 6,137,791 A | 10/2000 | Frid et al. | 370/352 |
| 6,141,684 A | 10/2000 | McDonald et al. | 709/222 |
| 6,175,879 B1 | 1/2001 | Shah et al. | 709/330 |
| 6,208,977 B1 | 3/2001 | Hernandez et al. | 705/34 |
| 6,229,887 B1 | 5/2001 | Albers et al. | 379/219 |
| 6,282,573 B1 | 8/2001 | Darago et al. | 709/229 |

(Continued)

FOREIGN PATENT DOCUMENTS

WO   WO 98/26381   12/1997

(Continued)

OTHER PUBLICATIONS

Draft—TR45—PN-3-4732-RV4 (to be published as TIA-835.1-D), 32 pages.

(Continued)

*Primary Examiner* — Pierre-Louis Desir

(74) *Attorney, Agent, or Firm* — Baker Botts L.L.P.

(57) ABSTRACT

In accordance with one embodiment of the present disclosure, a system for authentication of an access terminal generally includes a radio access network having a packet control function. The packet control function is operable to receive an extended authentication protocol (EAP) message from the access terminal, encapsulate the extended authentication protocol message in a radio-packet (RP) network message, and transmit the radio-packet network message to an IP gateway.

19 Claims, 5 Drawing Sheets

U.S. PATENT DOCUMENTS

| | | | |
|---|---|---|---|
| 6,295,447 B1 | 9/2001 | Reichelt et al. | 455/417 |
| 6,330,562 B1 | 12/2001 | Boden et al. | 707/10 |
| 6,332,163 B1 | 12/2001 | Bowman-Amuah | 709/231 |
| 6,339,832 B1 | 1/2002 | Bowman-Amuah | 714/35 |
| 6,434,568 B1 | 8/2002 | Bowman-Amuah | 707/103 R |
| 6,434,628 B1 | 8/2002 | Bowman-Amuah | 714/48 |
| 6,438,594 B1 | 8/2002 | Bowman-Amuah | 709/225 |
| 6,442,748 B1 | 8/2002 | Bowman-Amuah | 717/108 |
| 6,466,964 B1 | 10/2002 | Leung et al. | 709/202 |
| 6,477,580 B1 | 11/2002 | Bowman-Amuah | 709/231 |
| 6,477,665 B1 | 11/2002 | Bowman-Amuah | 714/39 |
| 6,480,485 B1 | 11/2002 | Kari et al. | 370/352 |
| 6,490,451 B1 | 12/2002 | Denman et al. | 455/436 |
| 6,493,547 B1 | 12/2002 | Raith | 455/405 |
| 6,496,850 B1 | 12/2002 | Bowman-Amuah | 709/203 |
| 6,502,213 B1 | 12/2002 | Bowman-Amuah | 714/49 |
| 6,510,513 B1 | 1/2003 | Danieli | 713/156 |
| 6,529,909 B1 | 3/2003 | Bowman-Amuah | 707/10 |
| 6,529,948 B1 | 3/2003 | Bowman-Amuah | 709/217 |
| 6,539,396 B1 | 3/2003 | Bowman-Amuah | 707/103 R |
| 6,549,949 B1 | 4/2003 | Bowman-Amuah | 709/236 |
| 6,550,057 B1 | 4/2003 | Bowman-Amuah | 717/126 |
| 6,571,282 B1 | 5/2003 | Bowman-Amuah | 709/219 |
| 6,578,068 B1 | 6/2003 | Bowman-Amuah | 709/203 |
| 6,601,192 B1 | 7/2003 | Bowman-Amuah | 714/38 |
| 6,601,234 B1 | 7/2003 | Bowman-Amuah | 717/108 |
| 6,606,660 B1 | 8/2003 | Bowman-Amuah | 709/227 |
| 6,611,821 B2 | 8/2003 | Stahl et al. | 705/400 |
| 6,615,199 B1 | 9/2003 | Bowman-Amuah | 706/50 |
| 6,615,253 B1 | 9/2003 | Bowman-Amuah | 709/219 |
| 6,615,263 B2 | 9/2003 | Dulai et al. | 709/225 |
| 6,621,820 B1 | 9/2003 | Williams et al. | 370/395.31 |
| 6,636,242 B2 | 10/2003 | Bowman-Amuah | 715/764 |
| 6,640,238 B1 | 10/2003 | Bowman-Amuah | 709/201 |
| 6,640,244 B1 | 10/2003 | Bowman-Amuah | 709/207 |
| 6,647,262 B1 | 11/2003 | Demetrescu et al. | 455/436 |
| 6,665,537 B1 | 12/2003 | Lioy | 455/435 |
| 6,665,718 B1 | 12/2003 | Chuah et al. | 709/225 |
| 6,671,675 B2 | 12/2003 | Iwamura | 705/30 |
| 6,684,243 B1 | 1/2004 | Euget et al. | 709/222 |
| 6,684,256 B1 | 1/2004 | Warrier et al. | 709/238 |
| 6,708,225 B1 | 3/2004 | Cho et al. | 709/317 |
| 6,714,515 B1 | 3/2004 | Marchand | 370/231 |
| 6,715,145 B1 | 3/2004 | Bowman-Amuah | 718/101 |
| 6,728,266 B1 | 4/2004 | Sabry et al. | 370/468 |
| 6,728,365 B1 | 4/2004 | Li et al. | 379/329 |
| 6,728,884 B1 | 4/2004 | Lim | 713/201 |
| 6,742,015 B1 | 5/2004 | Bowman-Amuah | 718/101 |
| 6,742,036 B1 | 5/2004 | Das et al. | 709/226 |
| 6,757,371 B2 | 6/2004 | Kim et al. | 379/114.22 |
| 6,768,726 B2 | 7/2004 | Dorenbosch et al. | 370/331 |
| 6,769,000 B1 | 7/2004 | Akhtar et al. | 707/103 R |
| 6,770,444 B2 | 8/2004 | Leung | 380/270 |
| 6,771,623 B2 | 8/2004 | Ton | 370/331 |
| 6,785,256 B2 | 8/2004 | O'Neill | 370/338 |
| 6,804,518 B2 | 10/2004 | Core et al. | 455/436 |
| 6,826,173 B1 | 11/2004 | Kung et al. | 370/352 |
| 6,829,709 B1 | 12/2004 | Acharya et al. | 713/160 |
| 6,834,341 B1 | 12/2004 | Bahl et al. | 713/156 |
| 6,839,338 B1 | 1/2005 | Amara et al. | 370/338 |
| 6,842,906 B1 | 1/2005 | Bowman-Amuah | 719/330 |
| 6,856,676 B1 | 2/2005 | Pirot et al. | 379/201.01 |
| 6,889,321 B1 | 5/2005 | Kung et al. | 713/153 |
| 6,907,501 B2 | 6/2005 | Tariq et al. | 711/118 |
| 6,910,074 B1 | 6/2005 | Amin et al. | 709/227 |
| 6,915,345 B1 | 7/2005 | Tummala et al. | 709/225 |
| 6,917,605 B2 | 7/2005 | Kakemizu et al. | 370/338 |
| 6,920,503 B1 | 7/2005 | Nanji et al. | 709/230 |
| 6,922,404 B1 | 7/2005 | Narayanan et al. | 370/338 |
| 6,925,160 B1 | 8/2005 | Stevens et al. | 379/121.05 |
| 6,947,401 B2 | 9/2005 | El-Malki et al. | 370/331 |
| 6,961,774 B1 | 11/2005 | Shannon et al. | 709/227 |
| 6,967,941 B2 | 11/2005 | Roy | 370/338 |
| 6,978,128 B1 | 12/2005 | Raman et al. | 455/414 |
| 6,980,802 B2 | 12/2005 | Jung | 455/436 |
| 6,980,962 B1 | 12/2005 | Arganbright et al. | 705/26 |
| 6,981,047 B2 | 12/2005 | Hanson et al. | 709/227 |
| 6,982,967 B1 | 1/2006 | Leung | 370/328 |
| 6,990,337 B2 | 1/2006 | O'Neill et al. | 455/422.1 |
| 6,993,333 B2 | 1/2006 | Laroia et al. | 455/436 |
| 7,003,294 B2 | 2/2006 | Singhai et al. | 455/435.1 |
| 7,020,697 B1 | 3/2006 | Goodman et al. | 709/223 |
| 7,024,687 B2 | 4/2006 | Chaudhuri et al. | 726/3 |
| 7,028,311 B2 | 4/2006 | Roach et al. | 719/328 |
| 7,039,027 B2 | 5/2006 | Bridgelall | 370/329 |
| 7,054,268 B1 | 5/2006 | Parantainen et al. | 370/231 |
| 7,079,499 B1 | 7/2006 | Akhtar et al. | 370/310 |
| 7,082,301 B2 | 7/2006 | Jagadeesan et al. | 455/436 |
| 7,103,359 B1 | 9/2006 | Heinonen et al. | 455/436 |
| 7,127,234 B2 | 10/2006 | Ishii | 455/411 |
| 7,130,286 B2 | 10/2006 | Koodli et al. | 370/331 |
| 7,133,386 B2 | 11/2006 | Holur et al. | 370/331 |
| 7,151,758 B2 | 12/2006 | Kumaki et al. | 370/331 |
| 7,151,772 B1 | 12/2006 | Kalmanek et al. | 370/390 |
| 7,154,868 B1 | 12/2006 | Sharma et al. | 370/331 |
| 7,161,914 B2 | 1/2007 | Shoaib et al. | 370/331 |
| 7,171,555 B1 | 1/2007 | Salowey et al. | 713/156 |
| 7,184,418 B1 | 2/2007 | Baba et al. | 370/331 |
| 7,187,931 B2 | 3/2007 | Trossen | 455/440 |
| 7,190,793 B2 | 3/2007 | Hsu | 380/270 |
| 7,197,763 B2 | 3/2007 | Hsu | 726/4 |
| 7,212,821 B2 | 5/2007 | Laroia et | 455/437 |
| 7,230,951 B2 | 6/2007 | Mizell et al. | 370/401 |
| 7,233,583 B2 | 6/2007 | Asthana et al. | 370/332 |
| 7,251,733 B2 | 7/2007 | Haverinen et al. | 713/182 |
| 7,263,371 B2 | 8/2007 | Das et al. | 455/456.1 |
| 7,269,727 B1 | 9/2007 | Mukherjee et al. | 713/160 |
| 7,272,122 B2 | 9/2007 | Trossen et al. | 370/331 |
| 7,272,123 B2 | 9/2007 | Wall | 370/331 |
| 7,275,156 B2 | 9/2007 | Balfanz et al. | 713/168 |
| 7,389,106 B2 | 6/2008 | Dawson et al. | 455/406 |
| 2001/0023428 A1 | 9/2001 | Miyazaki et al. | 709/201 |
| 2002/0021681 A1 | 2/2002 | Madour | 370/331 |
| 2002/0023174 A1 | 2/2002 | Garrett et al. | 709/245 |
| 2002/0036982 A1 | 3/2002 | Chen | 370/230 |
| 2002/0059114 A1 | 5/2002 | Cockrill et al. | 705/27 |
| 2002/0091802 A1 | 7/2002 | Paul et al. | 709/220 |
| 2002/0138601 A1 | 9/2002 | Piponius et al. | 709/223 |
| 2002/0151312 A1 | 10/2002 | Bos et al. | 455/452 |
| 2003/0021252 A1 | 1/2003 | Harper et al. | 370/338 |
| 2003/0039237 A1 | 2/2003 | Forslow | 370/352 |
| 2003/0154400 A1 | 8/2003 | Pirttimaa et al. | 713/201 |
| 2003/0187817 A1 | 10/2003 | Agrawal et al. | 707/1 |
| 2003/0217165 A1 | 11/2003 | Buch et al. | 709/229 |
| 2004/0008649 A1* | 1/2004 | Wybenga et al. | 370/338 |
| 2004/0114553 A1 | 6/2004 | Jiang et al. | 370/328 |
| 2004/0162876 A1 | 8/2004 | Kohavi | 709/203 |
| 2004/0162892 A1 | 8/2004 | Hsu | 709/221 |
| 2004/0196821 A1 | 10/2004 | Haddad et al. | 370/349 |
| 2004/0210524 A1 | 10/2004 | Benenati et al. | 705/40 |
| 2004/0214576 A1* | 10/2004 | Myers et al. | 455/455 |
| 2004/0259562 A1 | 12/2004 | Madour | 455/452.2 |
| 2005/0002407 A1 | 1/2005 | Shaheen et al. | 370/401 |
| 2005/0025132 A1 | 2/2005 | Harper et al. | 370/352 |
| 2005/0130659 A1 | 6/2005 | Grech et al. | 455/436 |
| 2005/0149651 A1 | 7/2005 | Doak et al. | 710/52 |
| 2005/0176428 A1 | 8/2005 | Gabor et al. | 455/435.1 |
| 2005/0195766 A1 | 9/2005 | Nasielski et al. | 370/331 |
| 2005/0201324 A1 | 9/2005 | Zheng | 370/328 |
| 2005/0213606 A1 | 9/2005 | Huang et al. | 370/467 |
| 2005/0220039 A1 | 10/2005 | Hoshino et al. | 370/261 |
| 2005/0278420 A1 | 12/2005 | Hartikainen et al. | 709/203 |
| 2005/0286709 A1 | 12/2005 | Horton et al. | 379/265.09 |
| 2006/0014547 A1 | 1/2006 | Walter | 455/456.1 |
| 2006/0018272 A1 | 1/2006 | Mutikainen et al. | 370/328 |
| 2006/0077924 A1* | 4/2006 | Rune | 370/328 |
| 2006/0116113 A1 | 6/2006 | Gass | 455/414.4 |
| 2006/0126630 A1 | 6/2006 | Shirazipour et al. | 370/392 |
| 2006/0171310 A1 | 8/2006 | Ahluwalia et al. | 370/229 |
| 2006/0251038 A1 | 11/2006 | Tamura et al. | 370/342 |
| 2006/0253703 A1 | 11/2006 | Enron et al. | |
| 2006/0264207 A1 | 11/2006 | Tamura et al. | 455/415 |
| 2006/0268819 A1 | 11/2006 | Chen et al. | 370/349 |
| 2007/0008882 A1 | 1/2007 | Oran | 370/229 |
| 2007/0036312 A1 | 2/2007 | Cai et al. | 379/126 |
| 2007/0086582 A1 | 4/2007 | Tai et al. | 379/114.01 |
| 2007/0094712 A1 | 4/2007 | Gibbs et al. | 726/3 |

| | | | | |
|---|---|---|---|---|
| 2007/0101122 | A1 | 5/2007 | Guo | 713/153 |
| 2007/0121615 | A1 | 5/2007 | Weill et al. | 370/389 |
| 2007/0121642 | A1 | 5/2007 | Battin et al. | 370/395.2 |
| 2007/0153720 | A1* | 7/2007 | Baglin et al. | 370/328 |
| 2007/0254661 | A1 | 11/2007 | Chowdhury | 455/436 |
| 2007/0291756 | A1* | 12/2007 | Akhtar et al. | 370/392 |

FOREIGN PATENT DOCUMENTS

| | | |
|---|---|---|
| WO | WO 99/31610 | 12/1998 |
| WO | WO 2005/107297 | 11/2005 |

OTHER PUBLICATIONS

Draft—TR45—PN-3-4732-RV4 (to be published as TIA-835.2-D), 93 pages.
Draft—TR45—PN-3-4732-RV4 (to be published as TIA-835.3-D), 36 pages.
Draft—TR45—PN-3-4732-RV4 (to be published as TIA-835.4-D), 70 pages.
Draft—TR45—PN-3-4732-RV4 (to be published as TIA-835.5-D), 72 pages.
Draft—TR45—PN-3-4732-RV4 (to be published as TIA-835.6-D), 36 pages.
3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.
3GPP2 X.S0011-001-D, 3rd Generation Partnership Project 2 '3GPP2', "cdma2000 Wireless IP Network Standard: Introduction," Version 1.0, 33 pages, Feb. 2006.
3GPP2 C.S0063-0, 3rd Generation Partnership Project 2 '3GPP2', "cdma2000 High Rate Packet Data Supplemental," Version 1.0, 127 pages, Mar. 2006.
3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 257 pages, Mar. 2006.
3GPP2 C.S0024-A, 3rd Generation Partnership Project 2 '3GPP2', "cdma2000 High Rate Packet Data Air Interface Specification," Version 2.0, 1,223 pages, Jul. 2005.
B. Aboba, et al., "Extensible Authentication Protocol (EAP)," Network Working Group, RFC 3748, http://www.ietf.org/rfc/rfc3748.txt, 59 pages, Jun. 2004.
B. Aboba, D. Simon, "PPP EAP TLS Authentication Protocol," Network Working Group, RFC 2716, http://www.ietf.org/rfc/rfc2716.txt, 22 pages, Oct. 1999.
W. Simpson, "PPP Challenge Handshake Authentication Protocol (CHAP)," Network Working Group, RFC 1994, http://www.ietf.org/rfc/rfc1994.txt, 12 pages, Aug. 1996.
W. Simpson, "The Point-to-Point (PPP)," Network Working Group, RFC 1661, http://www.ietf.org/rfc/rfc1661.txt, 47 pages, Jul. 1994.
P. Eronen, et al., "Diameter Extensible Authentication Protocol (EAP) Application," Network Working Group, RFC 4072, http://www.ietf.org/rfc/rfc4072.txt, 29 pages, Aug. 2005.
P. Calhoun, et al., "Diameter Base Protocol," Network Working Group, RFC 3588, http://www.ietf.org/rfc/rfc3588.txt, 129 pages, Sep. 2003.
3rd Generation Partnership Project 2 "3GPP2"; "All-IP Core Network Multimedia Domain: Service Based Bearer Control- Stage 2;www.3gpp2.org-"; Version 1.0. Draft Version 0.21.0, 49 pages.
PCT Notification of Transmittal of the International Search Report and the Written Opinion of the International Searching Authority, or the Declaration, International Application No. PCT/US07/05847, 9 pages, Oct. 26, 2007.
PCT Notification of Transmittal of the International Search Report and the Written Opinion of the International Searching Authority, or the Declaration, International Application No. PCT/US07/05849, 9 pages, Nov. 14, 2007.
Yegani et al., "System and Method for Access Authentication in a Mobile Wireless Network," U.S. Appl. No. 11/419,382, 20 pps, 3 pps drawings, filed May 19, 2006.
Yegani et al., "System and Method for Handover of an Access Terminal in a Communication Network," U.S. Appl. No. 11/682,735, 24 pps, 3 pps drawings, filed Mar. 6, 2007.

Yegani et al., "Enforcement of User Level Policies from Visited Networks in a Mobile IP Environment," U.S. Appl. No. 11/682,817, 22 pps, 2 pps drawings, filed Mar. 6, 2007.
Andreasen et al., "System and Method of Consolidating Accounting Data for a Communication Session," U.S. Appl. No. 11/714,974, 40 pps, 3 pps drawings, filed Mar. 6, 2007.
Panda et al., "System and Method for Capturing Accounting Data for a Communication Session," U.S. Appl. No. 11/715,018, filed Mar. 6, 2007.
Rosenberg et al., "System and Method for Determining a Network for Processing Applications for a Communication Session," U.S. Appl. No. 11/715,019, 40 pps, 3 pps drawings, filed Mar. 6, 2007.
Rosenberg et al., "Determining a Policy Output for a Communication Session," U.S. Appl. No. 11/715,032, 31 pps, 4 pps drawings, filed Mar. 6, 2007.
Leung et al., "Communicating Packets Using a Home Anchored Bearer Path," U.S. Appl. No. 11/715,033, 33 pps, 4 pps drawings, filed Mar. 6, 2007.
Andreasen et al., "Posture-Based Network Authentication," U.S. Appl. No. 11/715,040, 23 pages, 2 pps drawings, filed Mar. 6, 2007.
Iyer et al., "Access Terminal for Communicating Packets Using a Home Anchored Bearer Path," U.S. Appl. No. 11/715,041, 33 pps, 4 pps drawings, filed Mar. 6, 2007.
Rosenberg et al., "System and Method for Exchanging Policy Information in a Roaming Communications Environment," U.S. Appl. No. 11/715,056, 42 pps, 3 pps drawings, filed Mar. 6, 2007.
Rosenberg et al., "Establishing Facets of a Policy for a Communication Session," U.S. Appl. No. 11/715,065, 32 pps, 4 pps drawings, filed Mar. 6, 2007.
Rosenberg et al., "Performing Deep Packet Inspection for a Communication Session," U.S. Appl. No. 11/715,073, 31 pps, 4 pps drawings, filed Mar. 6, 2007.
Rosenberg et al., "Assigning a Serving—CSCF During Access Authentication," U.S. Appl. No. 11/715,074, 22 pps, 2 pps drawings, filed Mar. 6, 2007.
Rosenberg et al., "System and Method for Providing Emergency Services in a Visited Communications Environment," U.S. Appl. No. 11/715,111, 39 pps, 2 pps drawings, filed Mar. 6, 2007.
Panda et al., "Application-Aware Policy Enforcement," U.S. Appl. No. 11/715,187, 28 pps, 2 pps drawings, filed Mar. 6, 2007.
Andreasen et al., "System and Method for Generating a Unified Accounting Record for a Communication Session," U.S. Appl. No. 11/715,210, 46 pps, 3 pps drawings, filed Mar. 6, 2007.
Andreasen et al., "Network-triggered quality of service (QoS) Reservation," U.S. Appl. No. 11/715,250, 21 pps, 2 pps drawings, filed Mar. 6, 2007.
Andreasen et al.,; "Policy-Based Control of Content Intercept", U.S. Appl. No. 11/715,251, 23 pps, 2 pps drawings.
Rosenberg et al., "System and Method for Network Charging Using Policy Peering," U.S. Appl. No. 11/715,256, 43 pps, 3 pps drawings, filed Mar. 6, 2007.
Online Inc., "Apogee Releases Content Usage-Based Billing Product Annotated Title—Software allows content usage-based billing," EContent, vol. 24, No. 5, NDN 173-0356-6509-7, 1 pg., Jul. 2001.
Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg., Jun. 28, 2001.
Karsten Lüttge, "E-Charging API: Outsource Charging to a Payment Service Provider," NDN 174-0708-0924-8, pp. 216-227, 2001.
A. Herzberg, "Safeguarding Digital Library Contents: Charging for Online Content," D-Lib Magazine, NDH 174-0590-9051-8, 16 pgs., Jan. 1998.
Business Wire, "Apogee Networks Introduces Industry's First Content Usage-Based Billing Solution for Web Hosters," NDN 219-0281-6988-1, 2 pgs., May 8, 2001.
Business Wire, "Apogee Networks Announces Investment by Cisco Systems; Combined Efforts Enhance Billing Capabilities for Content Delivery Network Providers," NDN 219-0220-9035-0, 2 pgs., Jan. 23, 2001.
Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs., Oct. 10, 2000.

Business Wire, "Apogee Networks Unveils NetCountant Wireless Billing At SUPERCOMM; Company Demonstrates Industry First Wireless Content Usage Based Billing Solution," NDN 218-0324-8075-6, 2 pgs., Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs., Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs., Dec. 6, 2000.

Business Wire, "Apogee Networks Joins Content Alliance; Billing Expert to Join Industry Group Aimed At Advancing Content Networking," NDN 218-0181-2716-7, 3 pgs., Oct. 11, 2000.

Business Wire, "Apogee Networks, Inc. And Paysys International, Inc. to Integrate Technologies to Create Advanced IP Content Billing Solutions," NDN 218-0098-0623-9, 3 pgs., Jun. 19, 2000.

Ylitalo, et al., *Re-thinking Security in IP based Micro-Mobility*, downloaded from www.tcs.hut.fi/Studies/T-79.5401/2005AUT/ISC04-Vlitalo-e-al.pdf (12 pages).

PCT Notification of Transmittal of the International Search Report and the Written Opinion of the International Searching Authority, or the Declaration with attached PCT International Search Report and Written Opinion of the International Searching Authority in International Application No. PCT/US 07/05937, dated Oct. 25, 2007, 6 pages, Oct. 25, 2007.

*USPTO; Office Action* dated Dec. 15, 2008 for U.S. Appl. No. 11/419,382, filed May 19, 2006 in the name of Parviz Yegani, 38 pages.

PCT Notification of Transmittal of the International Search Report and the Written Opinion of the International Searching Authority, or the Declaration with attached PCT International Search Report and Written Opinion of the International Searching Authority in International Application No. PCT/US2006/046800, dated Nov. 10, 2008, 10 pages, Nov. 10, 2008.

USPTO Office Action for U.S. Appl. No. 11/419,382, filed May 19, 2006, inventor Parviz Yegani; 23 pages.

USPTO Notice of Allowance; U.S. Appl. No. 11/419,382, filed May 19, 2006, inventor Parviz Yegani; 8 pages.

\* cited by examiner

AUTHENTICATION OF ACCESS TERMINALS IN A CELLULAR COMMUNICATION NETWORK

RELATED APPLICATION

This application claims priority under 35 U.S.C. §119(e) of U.S. Provisional Application Ser. No. 60/780,176, entitled "VERIZON WIRELESS MULTI-MEDIA PLUS (MMD+) PROGRAM SYSTEM ARCHITECTURE DOCUMENT," filed Mar. 6, 2006, by Flemming Andreasen et al., which is incorporated herein by reference.

TECHNICAL FIELD OF THE DISCLOSURE

This disclosure relates in general to cellular communication networks, and more particularly to authentication of access terminals in a cellular communication network.

BACKGROUND OF THE DISCLOSURE

Authentication of access terminals in a cellular communication network is an important aspect of proper cellular communication network operation. Cellular communication network architectures may utilize one or more authentication mechanisms for connecting access terminals to the network. These authentication mechanisms may verify the identity of the user prior to allowing access to the cellular communication network.

The Point-to-Point Protocol (PPP) is one example of an authentication mechanism used by a cellular communication network. The PPP protocol is generally a link layer protocol that may be used to simultaneously authenticate multiple applications. A cellular communication network offering multiple services, such as voice call services and data communication services, may authenticate these services using the PPP protocol.

SUMMARY OF THE DISCLOSURE

In accordance with one embodiment of the present disclosure, a system for authentication of an access terminal generally includes a radio access network having a packet control function. The packet control function is operable to receive an extended authentication protocol (EAP) message from the access terminal, encapsulate the extended authentication protocol message in a radio-packet (RP) network message, and transmit the radio-packet network message to an IP gateway.

Embodiments of the disclosure may provide numerous technical advantages. Some, none, or all embodiments may benefit from the below described advantages. According to one embodiment, a radio-packet network may be enhanced to carry EAP messages for authenticating access terminals in a cellular communication network. The EAP messages may be encapsulated in various radio-packet network messages that may be, for example, A9, A10, A11, or A12 radio-packet network messages. For example, an EAP message may be encapsulated in an A10 message. The A10 message supports a generic routing encapsulation (GRE) protocol that provides a relatively efficient encapsulation mechanism for EAP messages.

Other technical advantages will be apparent to one of skill in the art.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Known authentication mechanisms for cellular communication networks, such as the point-to-point Protocol (PPP), may not be well suited for use with cellular communication networks. The PPP protocol utilizes a relatively complex state machine and therefore requires significant memory and processing resources. Furthermore, the PPP protocol uses octet-based high level data-link control (HDLC) framing that may not be optimized for packet data transport over cellular communication networks. Also, known authentication mechanisms using the PPP protocol require setup times that may be several seconds or more. This latency may be prohibitive for data network based applications, such as Voice-over-IP (VoIP).

Figure 1:
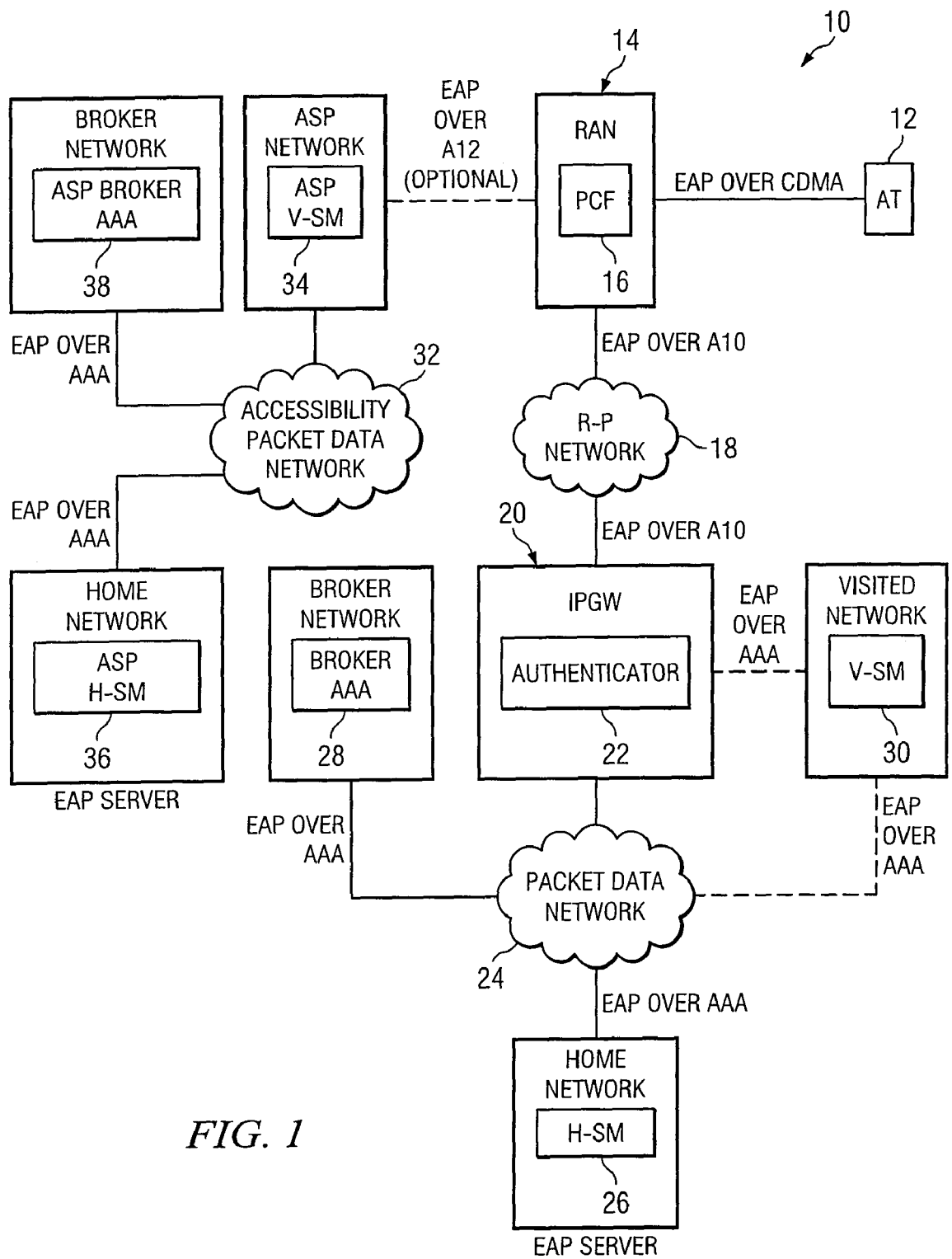
FIG. 1 is a diagram illustrating one embodiment of a cellular communication network in accordance with the teachings of the present disclosure.

FIG. 1 is a diagram illustrating one embodiment of a cellular communication network 10 in accordance with the teachings of the present disclosure. Cellular communication network 10 may facilitate authentication of access terminal 12 with the home security manager 26 of a packet data network 24 using one or more extensible authentication protocol (EAP) methods. Optionally, cellular communication network 10 may also facilitate authentication of access terminal 12 with a home security manager 36 of a an accessibility packet data network 32 using one or more EAP methods.

Cellular communication network 10 generally comprises an access terminal 12, a radio access network 14, a radio-packet network 18, an Internet Protocol (IP) gateway 20, a packet data network 24, a home security manager 26, a broker authentication, authorization, and accounting (AAA) server 28, a visited security manager 30, an accessibility packet data network 32, a visited security manager 34, home security manager 36, and a broker AAA server 38. Radio access network 14 is coupled to an IP gateway (IPGW) 20 through a radio-packet (RP) network 18. IP gateway 20 is coupled to a home security manager (H-SM) through a packet data network 24.

According to one embodiment of operation, cellular communication network 10 may transport EAP messages from access terminal 12 to home security manager 26, which may serve as an EAP server, through broker AAA server 28. In another embodiment, EAP messages may be conveyed from access terminal 12 in visited security manager 30 for authentication of access terminal 12 to a visited packet data network 24. In this particular embodiment, access terminal 12 may be provided with access rights governed by a shared service agreement between a home service provider and a visited service provider.

Access terminal 12 may be any suitable cellular communication network aware device, that may be, for example, a cellular telephone, a personal computer, a pager, a pocket computer, a notebook computer, or a personal digital assistant (PDA). Access terminal 12 may communicate with radio access network 14 using any suitable wireless communication network protocol. Examples of a suitable wireless communication network protocols include code division multiple access (CDMA), integrated digital enhanced network (iDEN), and time division multiple access (TDMA) protocols.

The radio access network 14 provides an air interface for coupling the access terminal 12 to a core network, which in this case, is the IP gateway 20. Radio access network 14 may be any suitable type of air interface network, such as a Universal Mobile Telecommunications System (UTMS) or a Global System for Mobile Communications (GSM) network telecommunication system.

The IP gateway 20 may be used to route packets between the RP network 18 and the packet data network 24. IP gateway 20 may represent a device operable to provide an interface in between radio access network 14 and packet data network 24. IP gateway 20 may perform any suitable operations. For example, IP gateway 20 may convert communications from a protocol used by RP network 18 to a protocol used by packet data network 24, or vice-versa.

The packet data network 24 may be any type of network used to transmit information from one node or service access point to another. For example, the packet data network 24 may be one or more of the following: an IP network, the Internet, a Public Switched Telephone Network (PSTN), or a wireless network. The packet data network 24 may also include one or more local area networks (LANs) and/or wide area networks (WANs).

The home security manager 26 may function as an EAP server for authentication of access terminal 12 in packet data network 24. The home security manager 26 may also provide authentication information to visited security manager 30 that may be used to authenticate access terminals 12 that are roaming at the visited network. The broker AAA server 28 manages authentication guidelines of wireless service providers and sends these guidelines to their associated visited security managers 30 upon authentication of a roaming access terminal 12. These authentication guidelines may be based upon roaming agreements established among the various wireless service providers.

Accessibility packet data network 32 may be generally referred to as an "IP pipe" through which Internet access may be provided without providing session based services, such as voice call services. Accessibility packet data network 32 may be coupled to a home security manager 36, a visited security manager 34, and broker AAA server 38 that may be similar to home security manager 26, visited security manager 30, and broker AAA server 28, respectively.

In one embodiment of operation, the radio access network 14 may transmit EAP messages to the accessibility packet data network 32 through the visited security manager 34 using any suitable radio-packet network compliant protocol. In one embodiment, the radio-packet compliant protocol may be an A12 radio-packet network protocol. The A12 radio-packet network protocol provides a relatively secure link from end-to-end and may be well suited for transport of EAP messages if no IP gateway is used. Authentication of access terminal 12 to home security manager 36 may be accomplished in a manner similar to authentication to home security manager 26.

Radio access network 14 includes a packet control function 16 that may be implemented with a processor executing computer instructions stored in a memory. Packet control function 16 may relay EAP messages from access terminal 12 to a suitable network node, for example, an IP gateway 20. To accomplish this, packet control function 16 may communicate EAP messages to and from the access terminal 12 using a high rate packet data (HRPD) network protocol, such as a code division multiple access (CDMA) cellular communication protocol. Packet control function 16 may encapsulate the EAP message in a radio-packet network message for transmission to IP gateway 20.

IP gateway 20 may include an authenticator 22 for managing access to the packet data network 24. The functions of the authenticator 22 may be implemented with a processor executing computer instructions stored in a memory. Authenticator 22 may encapsulate EAP messages in a radio-packet network message for transmission to radio access network 14. Authenticator 22 may also provide for peer associations with other IP gateways (not specifically shown) configured in the cellular communication network 10. Using these peer associations, the authenticator 22 may be operable to communicate session parameters with authenticators 22 at other peer IP gateways if the access terminal 12 roams to another domain.

In one embodiment, radio-packet network messages transmitted by packet control function 16 and/or authenticator 22 may be encapsulated according to any suitable protocol that may be supported by the radio-packet network. In one embodiment, radio-packet network message may be an A10 message. The A10 message includes a packet header that provides support for a generic routing encapsulation (GRE) protocol. The packet control function 16 may populate the packet header with information that identifies the message as including an EAP message. Upon receipt of the A10 message by authenticator 22, header information may be deciphered in order to extract the EAP message from the A10 packet. Authenticator 22 may then encapsulate the EAP message in an AAA protocol network message that may be transmitted through the packet data network 24.

Modifications, additions, or omissions may be made to cellular communication network 10 without departing from the scope of the present disclosure. The components of cellular communication network 10 may be integrated or separated. For example, radio access network 14 may include any number of cellular communication related components, such as one or more packet data serving nodes (PDSNs) or base station controllers (BSCs) that enable remote communication with one or more access terminals 12. Additionally, the cellular communication network 10 may be administered by a number of cellular telecommunication service providers, each managing a domain including one or more radio access networks 14.

Figure 2:
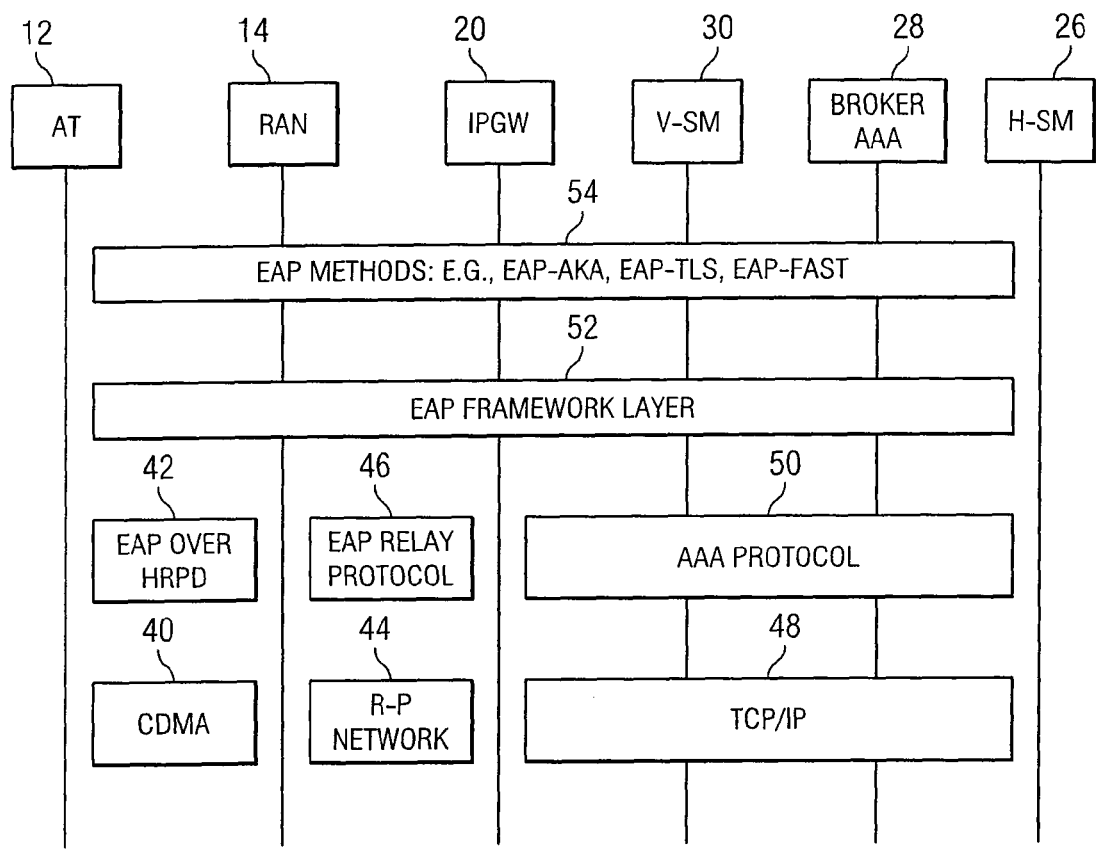
FIG. 2 is a diagram illustrating one embodiment of a protocol stack that may be used for authentication of access terminal on the cellular communication network of FIG. 1.

FIG. 2 is a diagram showing one embodiment of several protocol stacks that may be used for authentication of access terminal on the cellular communication network 10. In this particular embodiment, the underlying link from access terminal 12 to radio-packet network 18 is a CDMA compliant cellular network protocol layer 40. Any suitable high rate packet data (HRPD) network protocol layer, however, may be used with the teachings of the present disclosure. An EAP over HRPD layer 42 may enable transmission of EAP related messages between access terminal 12 and radio access network 14.

A radio-packet network layer 44 may be the underlying link between the radio access network 14 and the IP gateway 20. EAP relay protocol layer 46 may enable transmission of EAP related messages between the radio access network 14 and IP gateway 20. EAP relay protocol layer 46 generally provides one or more radio-packet network compliant protocols for transmission of EAP messages. Suitable radio-packet network compliant protocols may include, for example A9, A10, A11, or A12 message protocols.

A TCP/IP layer 48 may be the underlying link between the IP gateway 20, visited security manager 30, broker AAA server 28, and home security manager 26. The AAA protocol layer 50 uses the TCP/IP layer 48 to enable transmission of EAP related messages from IP gateway 20 to home security manager 26. The AAA protocol layer 50 may also facilitate encapsulation and transmission of EAP messages from IP gateway 20 to home security manager 26, visited security manager 30, or broker AAA server 28. In one embodiment, the AAA protocol layer 50 transports EAP messages using a Remote Authentication Dial In User Service (RADIUS) protocol. In another embodiment, the AAA protocol layer 50 transports EAP related messages using a DIAMETER protocol.

EAP framework layer 52 uses the EAP over HPRD layer 42, EAP relay protocol layer 46, and AAA protocol layer 50 for relatively seamless transmission of EAP messages from access terminal 12 to home security manager 26, visited security manager 30, or broker AAA server 28. EAP method layer 54 may include any suitable EAP method for authentication of access terminal 12 to home security manager 26. Examples of suitable EAP methods include EAP for Universal Mobile Telecommunications System (UMTS) Authentication and Key Agreement (EAP-AKA), EAP-Transport Level Security (EAP-TLS), and EAP Flexible Authentication via Secure Tunneling (EAP-FAST). EAP-TLS messages may be used for authentication and session key distribution using UTMS. EAP-TLS messages utilize a public key infrastructure (PKI) scheme. The various authentication methods provided in EAP method layer 54 enable relatively flexible authentication for differing types of data communication services provided by cellular communication network 10.

Figure 3:
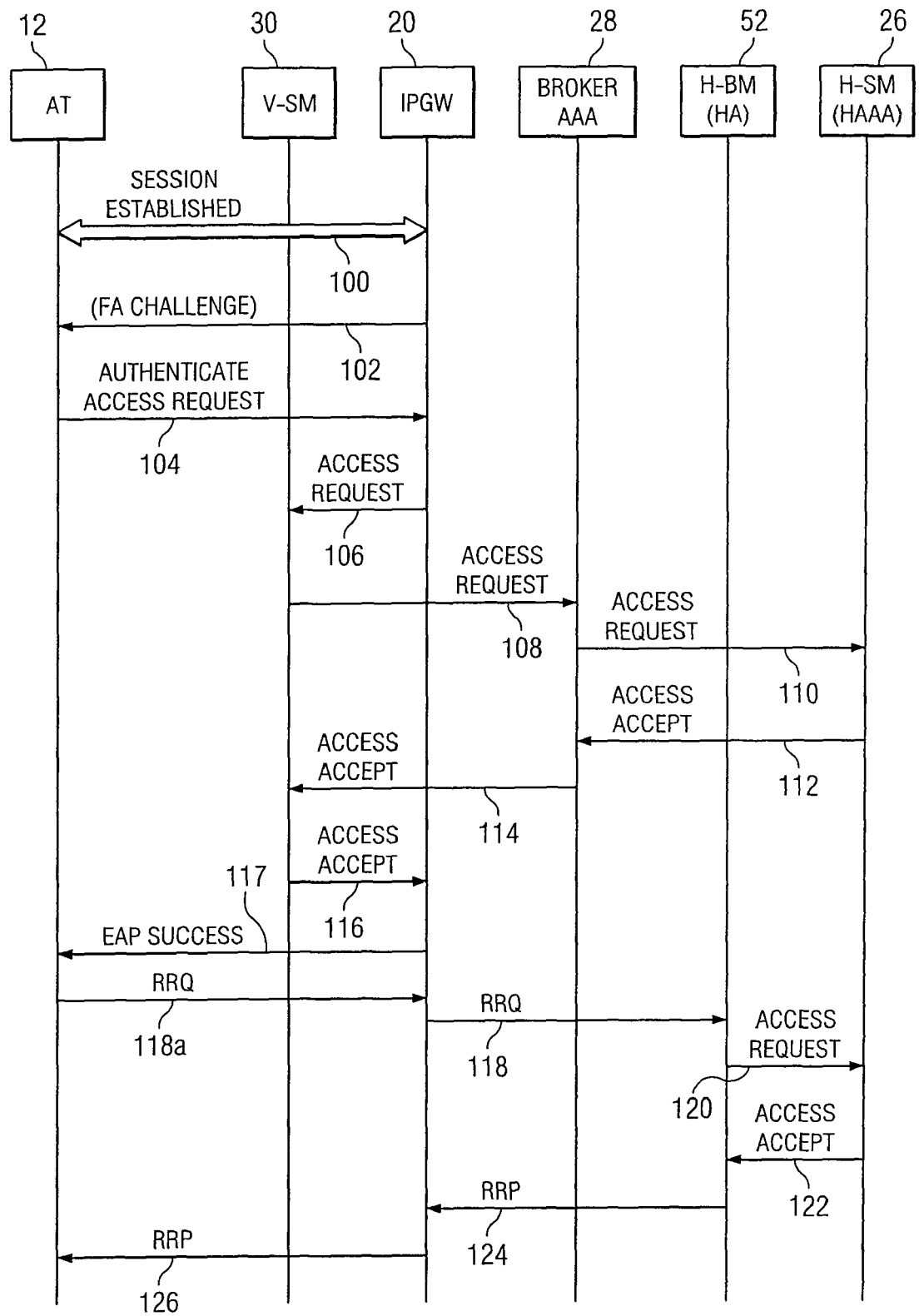
FIG. 3 is a call-flow diagram illustrating one embodiment of a mobile IP session setup on the cellular communication network of FIG. 1.

FIG. 3 is a call-flow diagram illustrating one embodiment of an authentication of a mobile IP session on the cellular communication network 10 using the EAP protocol. At step 100, the cellular communication network 10 establishes a session between the access terminal 12 and IP gateway 20. At step 102, the IP gateway 20 transmits a foreign agent (FA) challenge message to the access terminal 12. At step 104, receipt of the (FA) challenge message prompts access terminal 12 to send an authentication access request message to the IP gateway 20. At step 106, the IP gateway 20 forwards the authentication access request message to the visited security manager 30.

The authentication access request message may include the network access identifier (NAI) of the access terminal 12. In one embodiment, the visited security manager 30 examines the domain portion of the NAI and sends the authentication access request message directly to the pertinent home security manager 26. In this particular embodiment however, the visited security manager 30 sends the authentication access request message to the broker AAA server 28 for examination of the NAI at step 108. At step 110, the broker AAA server 28 sends the authentication access request message to the home security manager 26 indicated in the domain portion of the NAI.

At this point, the home security manager 26 authenticates the access terminal 12 according to any existing roaming agreements. In the particular embodiment in which the visited security manager 30 sends an authentication access request message directly to the home security manager 26, the home security manager 26 returns an AAA access accept message directly to the visited security manager 30. However in this particular embodiment at steps 112, 114, and 116, the home security manager 26 returns an EAP success in the AAA access accept message to the IP gateway 20 through the broker AAA server 28 and visited security manager 30. At step 117, the IP gateway 20 sends the EAP success message to the access terminal 12. At step 118a, the access terminal 12 sends a mobile IP RRQ message to the IP gateway 20. At step 118b, the IP gateway 20 forwards this RRQ message to a designated home bearer manager 32. At step 120, the home bearer manager 32 may respond by sending the access request message to the home security manager 26 in order to obtain the MN-HA key and other security parameters. At step 122, the home security manager 26 generates the MN-HA key and sends this MN-HA key to the home bearer manager 32. At step 124 and 126, the home bearer manager 32 sends a RRP message to the access terminal 12 through the IP gateway 20. At this point, mobile IP service authentication is complete.

Figure 4:
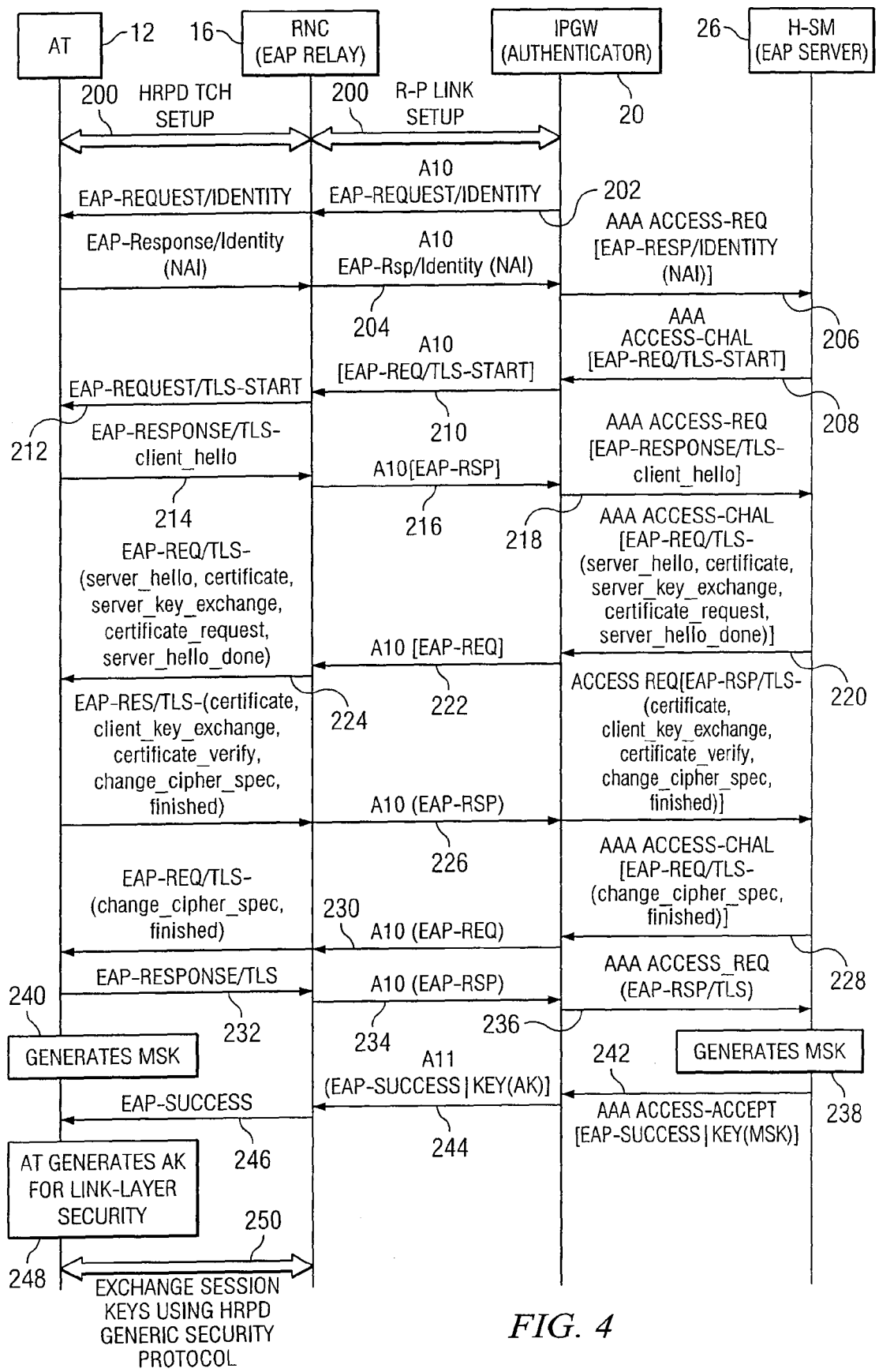
FIG. 4 is a call-flow diagram illustrating one embodiment of an authentication of an access terminal using an EAP-TLS method on the cellular communication network of FIG. 1.

FIG. 4 is a call-flow diagram showing one embodiment for authentication of an access terminal 12 in cellular communication network 10 using an EAP-TLS method. At step 200, cellular communication network 10 establishes a HRPD traffic channel between the access terminal 12 and packet control function 16. Additionally, cellular communication network 10 establishes a radio-packet link between the packet control function 16 and the IP gateway 20.

At step 202, the IP gateway 20 transmits an EAP request identity message including a NAI request message to the access terminal 12. As described above, the IP gateway 20 encapsulates the EAP request identity message in an A10 message using the mobile IP extension described above. This message is then transmitted to the packet control function 16. Upon receipt of the A10 message, packet control function 16 examines the GRE protocol header and realizes that the payload of the GRE packet contains EAP data. The packet control function 16 extracts the EAP data (i.e. EAP identity request message) and transmits this message to the access terminal 12.

At step 204, the access terminal 12 responds by sending an EAP response identity message including a NAI to the IP gateway 20. As described above, the packet control function 16 receives the EAP identity response message including a NAI from the access terminal 12, encapsulates the EAP response message in an A10 message, and then transmits the A10 message to the IP gateway 20. The packet control function 16 may set the protocol ID in the GRE header to indicate an EAP payload.

At step 206, the IP gateway 20 examines the domain portion of the NAI request message and sends an AAA access request message to a pertinent home security manager 26. At step 208, the home security manager 26 transmits an AAA access challenge message to the IP gateway 20. At step 210, the IP gateway 20 converts the AAA access challenge message to a TLS-start message and transmits this TLS-start message to the packet control function 16 through an A10 tunnel. At step 212, the packet control function extracts the TLS-start message from the A10 message and transmits this TLS-start message to the access terminal 12.

At step 214, the access terminal 12 responds to the TLS-start message by transmitting a TLS-client_hello message to the packet control function 16. At step 216, the packet control function 14 encapsulates the TLS-client_hello in an A10 message and then transmits this message to the IP gateway 20. At step 218, the IP gateway 20 extracts the TLS-client_hello message from the A10 message and transmits this message to the home security manager 26 as an AAA message.

At step 220, the home security manager 26 responds to the TLS-client_hello message by transmitting a TLS-server_hello message to the IP gateway 20 as one or more AAA formatted messages. The TLS-client_hello message may include a certificate, server_key_exchange, certificate_request, and server_hello_done messages. At step 222, the IP gateway 20 extracts the TLS-server_hello message and any other associated messages from the AAA messages. The IP gateway 20 then encapsulates the messages in one or more A10 messages and transmits these messages to the packet control function 16. At step 224, the packet control function 14 transmits the TLS-server hello to the access terminal 12.

At step 226, the access terminal 12 may respond to the TLS-server_hello message by transmitting one or more TLS-response messages to the home security manager 26. These TLS-response messages may include certificate, client_key_exchange, certificate_verify, change_cipher_spec, and finished messages.

At step 228, the home security manager 26 responds by transmitting one or more AAA access challenge messages to the IP gateway 20. At step 230, the IP gateway 20 forwards these messages are forwarded to the access terminal 12. At steps 232, 234, and 236, the access terminal 12 responds by transmitting a TLS-response message to the home security manager 26 in a similar manner as described above.

At step 238, the home security manager 26 generates a master session key (MSK) that will be used for encryption and validation of further messages transmitted to and from the access terminal 12 throughout the duration of the EAP-TLS session. At step 240, the access terminal 12 also generates master session key (MSK) that may be used with the master session key generated by the home security manager 26 for cross validation of messages over the cellular communication network 10.

At step 242, the home security manager 26 sends an AAA access accept message to the IP gateway 20. The AAA access accept message may include the master session key that was generated by the home security manager 26. In this manner, the IP gateway 20 may be operable to communicate session parameters with other peer IP gateways in the network in the event that the access terminal 12 roams into another domain. At steps 244, and 246, the IP gateway 20 transmits an EAP-success message to the access terminal 12.

At step 248, the access terminal 12 generates an authorization key (AK). The authorization key may be used for over the air encryption of messages between the radio access network and access terminal 12. Certain embodiments in which the authorization key is generated by the access terminal 12 may provide an advantage in that the authorization key may alleviate security problems caused by transmission of the authorization key over the HPRD network. At step 250, the access terminal 12 and packet control function 16 exchange session keys using a generic HRPD security protocol. At this point, EAP-TLS service authentication is complete.

Figure 5:
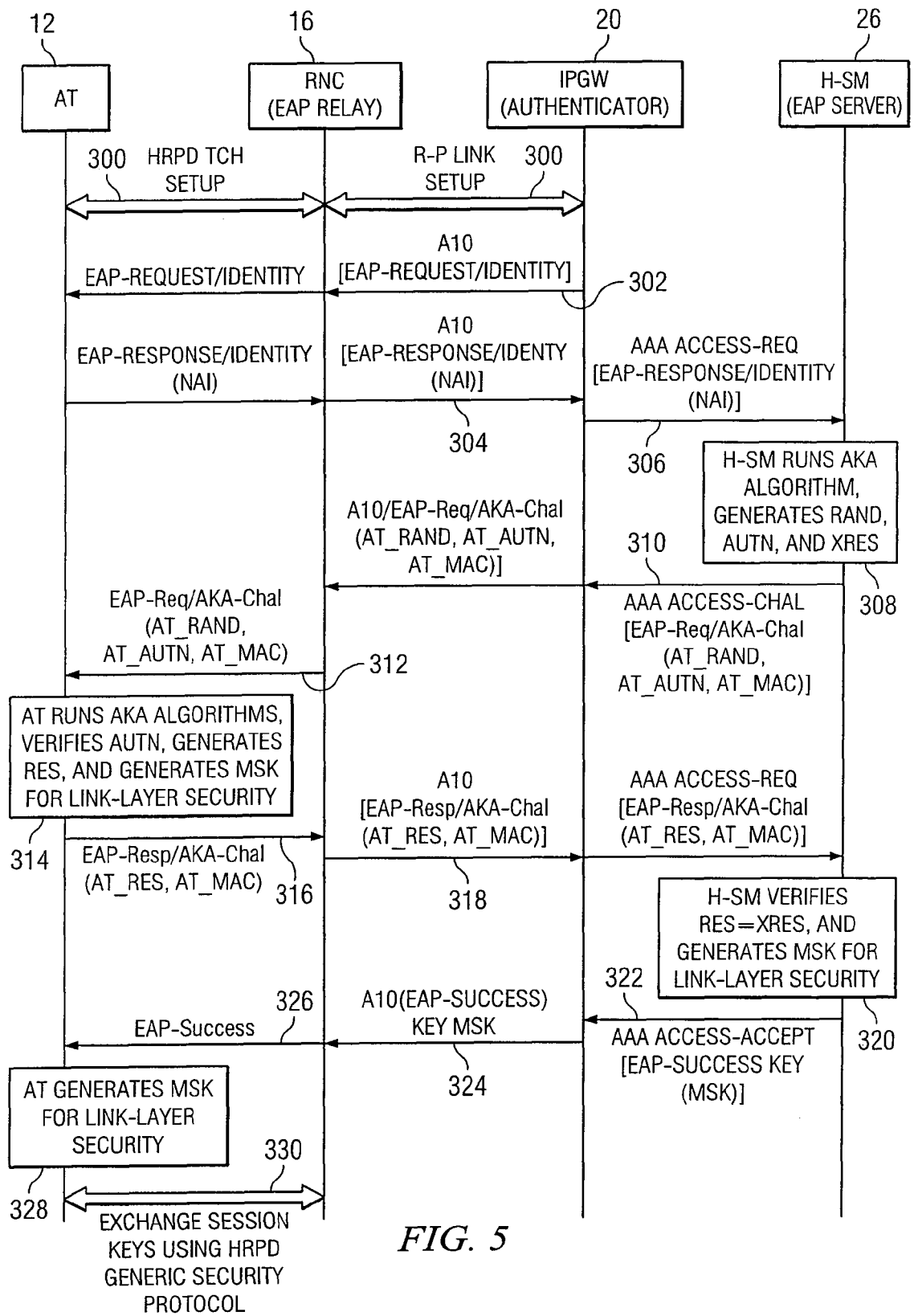
FIG. 5 is a call-flow diagram illustrating one embodiment of an authentication of an access terminal using an EAP-AKA method on the cellular communication network of FIG. 1.

FIG. 5 is a call-flow diagram showing one embodiment for authentication of an access terminal 12 in a cellular communication network 10 using an EAP-AKA authentication method. At step 300, the cellular communication network 10 establishes a HRPD traffic channel between the access terminal 12 and packet control function 16. Additionally, the cellular communication network 10 establishes a radio-packet link between the packet control function 16 and the IP gateway 20.

At step 302, the IP gateway 20 sends an EAP request identity message to the access terminal 12. As described above, the IP gateway 20 encapsulates the EAP request identity message in an A10 message (with the GRE protocol ID properly set) and then transmits this A10 message to the packet control function 16. Upon receipt of the A10 message, packet control function 16 extracts the EAP request identity message and transmits the EAP request identity message to the access terminal 12.

At step 304, the access terminal 12 responds by sending an EAP response identity message to the IP gateway 20. This EAP response identity message may include an NAI message indicating the identity of the access terminal 12. As described above, the packet control function 16 receives the EAP response identity message including the NAI response message from the access terminal 12, encapsulates the EAP response identity message in an A10 message, and then transmits the A10 message to the IP gateway 20. At step 306, the IP gateway 20 examines the domain portion of the NAI response message and sends an AAA access request message to the pertinent home security manager 26.

At step 308, the home security manager 26 executes an AKA algorithm, which may include generating RAND, AUTN, and/or XRES messages for transmission to the access terminal 12.

At step 310, the home security manager 26 transmits EAP access challenge messages including RAND, AUTN, and XRES messages to the packet control function 16. At step 312, the packet control function 16 encapsulates the EAP access challenge messages into A10 messages for transmission to the access terminal 12.

At step 314, the access terminal 12 executes an AKA algorithm using information provided in the received EAP access challenge messages. The AKA algorithm may be operable to verify the AUTN message and generate a RES message and master session key (MSK) for link-layer security.

At step 316, the access terminal 12 transmits EAP response messages including an AT_RES and AT_MAC messages to the packet control function 16. At step 318, the packet control function 16 encapsulate the EAP response messages in A10 messages and transmits these messages to the home security manager 26.

At step 320, the home security manager 26 verifies that the RES value, generated by the access terminal 12, is equivalent to the locally generated XRES value. The home security manager 26 may also generate a master session key that may be used throughout the current session with the access terminal 12.

At step 322, the home security manager 26 sends an EAP access accept message to the IP gateway 20. At step 324, the IP gateway 20 encapsulates the EAP access success message in an A10 message, and then transmits the A10 message to the packet control function 16. At step 326, the packet control function 16 extracts the EAP access success message from the A10 message and transmits the EAP access success message to the access terminal 12.

At step 328, the access terminal 12 generates a master session key for use throughout the current session with the home security manager 26.

At step 330, the access terminal 12 and packet control function 16 exchange session keys using a generic HRPD security protocol. At this point, EAP-AKA service authentication is complete.

Several example authentication methods have been described using the transmission of EAP messages from an access terminal 12 to a home security manager 26 in a cellular communication network 10. Those skilled in the art will recognize that other EAP authentication methods may be implemented using the teachings of the present disclosure. Additionally, these methods may be used to authenticate the various types of services available in an integrated cellular communication network, such as circuit-switched voice communication services, packet-switched voice communication services, as well as other types of data communication services, such as, e-mail messaging, Internet access, and instant messaging services.

Although the present disclosure and its advantages have been described in detail, it should be understood that various changes, substitutions, and alterations can be made therein without departing from the spirit and scope of this disclosure as defined by the appended claims.

What is claimed is:

1. A system for authenticating an access terminal, comprising:
   a memory operable to store information describing the access terminal; and
   a packet control function operable to:
      receive a first extended authentication protocol message from the access terminal;
      encapsulate the first extended authentication protocol message in a first A10 message;
      populate a packet header of the A10 message with information identifying the A10 message as encapsulating the first extended authentication protocol message; and
      transmit the first A10 message to an IP gateway, the IP gateway configured to route packets between a radio-packet network and a packet data network independently of a point-to-point protocol and to transmit the extended authentication protocol message to an extended authentication protocol server used to authenticate the access terminal.

2. The system of claim 1, wherein the packet control function is further operable to:
   receive a second A10 message from the network node;
   extract a second extended authentication protocol message from the second A10 message; and
   transmit the second extended authentication protocol message to the access terminal.

3. The system of claim 1, wherein the network node is operable to:
   receive the first radio-packet network message from the packet control function;
   extract the first extended authentication protocol message from A10 message; and
   transmit the first extended authentication protocol message to an extended authentication server.

4. The system of claim 1, wherein the network node is operable to:
   receive a second extended authentication protocol message from the extended authentication server;
   encapsulate the second extended authentication protocol message in a second A10 message; and
   transmit the second A10 message to the packet control function.

5. The system of claim 1, wherein the A10 message is formatted according to a generic routing encapsulation (GRE) protocol.

6. The system of claim 1, wherein the network node comprises an IP gateway.

7. A method for authenticating an access terminal by a packet control function, comprising:
   receiving a first extended authentication protocol message from the access terminal;
   encapsulating the first extended authentication protocol message in a first A10 message;
   populating a packet header of the A10 message with information identifying the A10 message as encapsulating the first extended authentication protocol message; and
   transmitting the first A10 message to an IP gateway, the IP gateway configured to route packets between a radio-packet network and a packet data network independently of a point-to-point protocol and to transmit the extended authentication protocol message to an extended authentication protocol server used to authenticate the access terminal.

8. The method of claim 7, further comprising:
   receiving a second A10 message from the network node;
   extracting a second extended authentication protocol message from the second A10 message; and
   transmitting the second extended authentication protocol message to the access terminal.

9. The method of claim 7, further comprising:
   receiving the first A10 message from the packet control function;
   extracting the first extended authentication protocol message from the A10 message; and
   transmitting the first extended authentication protocol message to the extended authentication server.

10. The method of claim 7, further comprising:
    receiving a second extended authentication protocol message from the extended authentication server;
    encapsulating the second extended authentication protocol message in a second A10 message; and
    transmitting the second A10 message to the packet control function.

11. The method of claim 7, wherein the first A10 message is formatted according to a generic routing encapsulation (GRE) protocol.

12. The method of claim 7, wherein the network node comprises an IP gateway.

13. A non-transitory computer-readable storage medium storing logic for authenticating an access terminal by a packet control function, the logic operable to:
    receive a first extended authentication protocol message from the access terminal;
    encapsulate the first extended authentication protocol message in a first A10 message; populate a packet header of the A10 message with information identifying the A10 message as encapsulating the first extended authentication protocol message; and
    transmit the first A10 message to an IP gateway, the IP gateway configured to route packets between a radio-packet network and a packet data network independently of a point-to-point protocol and to transmit the extended authentication protocol message to an extended authentication protocol server used to authenticate the access terminal.

14. The computer-readable storage medium of claim 13, further operable to:
    receive a second A10 message from the network node;
    extract a second extended authentication protocol message from the second A10 message; and
    transmit the second extended authentication protocol message to the access terminal.

15. The computer-readable storage medium of claim 13, further operable to:
    receive the first A10 message from the packet control function;
    extract the first extended authentication protocol message from the A10 message; and
    transmit the first extended authentication protocol message to the extended authentication server.

16. The computer-readable storage medium of claim 13, further operable to:
   receive a second extended authentication protocol message from the extended authentication server;
   encapsulate the second extended authentication protocol message in a second A10 message; and
   transmit the second A10 message to the packet control function.

17. The computer-readable storage medium of claim 13, wherein the A10 message is formatted according to a generic routing encapsulation (GRE) protocol.

18. The computer-readable storage medium of claim 13, wherein the network node comprises an IP gateway.

19. A system for authenticating an access terminal by a packet control function, comprising:
   means for receiving a first extended authentication protocol message from the access terminal;
   means for encapsulating the first extended authentication protocol message in a first A10 message;
   means for populating a packet header of the A10 message with information identifying the A10 message as encapsulating the first extended authentication protocol message; and
   means for transmitting the first A10 message to an IP gateway, the IP gateway configured to route packets between a radio-packet network and a packet data network independently of a point-to-point protocol and to transmit the extended authentication protocol message to an extended authentication protocol server used to authenticate the access terminal.

* * * * *